Patented Nov. 27, 1951

2,576,823

UNITED STATES PATENT OFFICE 2,576,823

FLUORINATION WITH GRANULAR CrF₃ CATALYST

Anthony Francis Benning, Woodstown, N. J., Joseph Dal Park, Boulder, Colo., and Stanley Earl Krahler, Wilmington, Del., assignors to E. I. du Pont de Nemours & Company, Wilmington, Del., a corporation of Delaware No Drawing. Application November 13, 1947, Serial No. 785,812

6 Claims. (Cl. 260—653)

This invention relates to the catalytic vapor phase fluorination of aliphatic halo-organic compounds, and more particularly to a catalyst and catalytic process for the vapor phase fluorination with hydrogen fluoride of halo-fluoro ethanes and propanes.

Fluoro-ethanes and fluoro-propanes such as $CF_3.CF_2Cl$, $CF_3.CHF_2$, $CF_3.CF_3$ and $CF_3.CFCl.CF_2Cl$ would be valuable for such uses as refrigerants, dielectric media, inert solvents and selective solvents in extraction operations if available commercially. However, these compounds have heretofore been made in the laboratory only by laborious means by the use of stringent and expensive fluorinating agents, such as $SbF_5$ and metal perfluorides, the latter being made from metal fluorides or chlorides with elemental fluorine and not being economically feasible for commercial exploitation at the present time. Fluoromethanes can be prepared economically by vapor phase reaction of hydrogen fluoride with a halomethane such as carbon tetrachloride in the presence of a catalyst prepared by impregnating a chromium halide on a carbon support such as granular charcoal or coke. Attempts to extend this type of reaction to the fluorination of halofluoro ethanes and propanes have resulted in poor organic recoveries and poor conversions to the desired products because of carbon-carbon fission, as will be shown herein.

It is an object of this invention to provide an economical and commercially practicable process for preparing fluorinated ethanes and propanes. It is a further object to provide a catalytic vapor phase process for reacting hydrogen fluoride with halo-fluoro ethanes or propanes to obtain fluorinated ethanes or propanes in good yields with high organic recovery. Another object is to provide a suitable catalyst for such a process. Other objects will appear hereinafter.

In accordance with the present invention it has been found that an economical and commercially practicable process for preparing fluorinated ethanes and propanes in good yields with high organic recoveries comprises reacting a halogenated aliphatic hydrocarbon of 2 to 3 carbon atoms, having at least one halogen atom other than fluorine, in the vapor phase with anhydrous hydrogen fluoride in the presence of substantially carbon-free $CrF_3$ catalyst at temperatures of from about 450° C. to about 700° C. for from about 1 to about 60 seconds, and separating the fluorinated ethane or propane from the reactants and resulting reaction products.

It has been found that this process is only successful when $CrF_3$ catalyst is provided in a substantially carbon-free form. This is contrary to the teaching of the art regarding the production of fluoromethanes, and the critical effect of carbon on the results is surprising. In accordance with this invention a process of preparing hard refractory pellets of $CrF_3$ catalyst in a substantially pure form suitable for use in the above reaction comprises mixing chromic fluoride with polytetrafluoroethylene binder, pressing the mixture into pellets, and heating the pellets in the presence of anhydrous hydrogen fluoride until water and binder are removed.

Halogenated aliphatic hydrocarbons of 2 to 3 carbon atoms which may be employed as starting compounds in the above process include $CF_2Cl.CF_2Cl$, $CF_2Cl.CHF_2$, $CF_3CFCl_2$, $CF_3.CF_2Cl$, $CF_3.CH_2Cl$, $CF_3.CHCl_2$, $CF_3.CFCl.CFCl_2$ and corresponding compounds in which chlorine is replaced by bromine or iodine.

Contrary to what might be expected, the HF organic mole ratio should be kept as low as practical; mole ratios of the order 0.5:1 being preferable to those in the range 3:1, with 4:1 constituting the upper limit. This derives from the fact that, due to its low molecular weight (20), the amount of HF used largely determines the contact time, and for a given temperature and organic flow the normally beneficial influence of increased HF concentration is balanced by the sharply decreased contact time. Conversely, lowering the organic feed at constant HF input serves merely to decrease the production rate.

The contact times of the reactants with the catalyst may be varied over a wide range of about 1 to about 60 seconds, depending upon the nature of the starting material, the reaction temperature and the yield desired. It is generally preferred to operate in the region of 10 to 30 seconds. The use of atmospheric pressures is convenient, but subatmospheric and superatmospheric pressures may be used if desired. The reaction temperature used varies with the compound being fluorinated and the product desired. When preparing $CF_3.CF_2Cl$ from $CF_2Cl.CF_2Cl$ it is preferable to operate at about 450° C. to about 550° C. to reduce the possibility of $CF_3.CF_3$ being formed. If $CF_3.CF_3$ is the desired product, higher temperatures, i. e. about 600° C. to about 700° C. should be used.

The catalyst may be prepared by mixing powdered $CrF_3$ or $CrF_3.3H_2O$ with sufficient polytetrafluoroethylene binder to lubricate the pellet mold and retain the chromic fluoride in pellet form after it is pressed into shape. About 2% of the weight of chromic fluoride has been found satisfactory. Larger amounts of binder may be used but serve no useful purpose. The binder may be incorporated with the chromic fluoride in a variety of ways as will be readily understood. It is conceivable that chromium salts other than fluorides, e. g. $CrCl_3$, may be formed into pellets and subsequently converted to chromic fluoride by treatment with hydrogen fluoride at high temperatures, but this offers no worthwhile advantage.

In order to more clearly illustrate the invention, the preferred methods of carrying it into effect and the advantageous results to be obtained thereby, the following examples are given:

Example 1

In the preparation of $CrF_3$ catalyst, 1690 parts of finely ground $CrF_3.3H_2O$ were intimately mixed with 34 parts of finely pulverized polytetrafluoroethylene and pressed into the shape of pellets $\frac{3}{16}'' \times \frac{1}{4}''$. These pellets were placed in an unlined Inconel tube and heated slowly to 850° C. in an atmosphere of anhydrous hydrogen fluoride. Substantially all of the water of hydration and the polytetrafluoroethylene binder were thereby removed, leaving pure $CrF_3$ pellets, $\frac{9}{64}'' \times \frac{3}{16}''$, which were quite hard and refractory and possessed high resistance to crushing. A catalyst bed of the pellets was provided extending for 22 inches of the 1.61 inch inside diameter by 45 inches long unlined Inconel tube reactor. The temperature of the reactor was gradually raised to and then maintained at 480° C. to 500° C. by an electrically heated furnace, the temperature being measured by a thermocouple placed on the outside of the reactor tube. A mixture of anhydrous HF and $CF_2Cl.CF_2Cl$ (boiling point 3–4° C.) in the molal ratio of 2.1:1 was passed at atmospheric pressure through the reactor at a rate providing a contact time of 26–28 seconds with the catalyst bed. The reaction products were washed with water, passed through soda-lime and calcium chloride and finally condensed in traps cooled with solid $CO_2$ in acetone and with liquid nitrogen. Analysis of the condensate showed the following composition:

| Compound: | Mol percent |
|---|---|
| $CF_3Cl$ | 8.2 |
| $CF_3.CF_3$ | Trace |
| $CF_3.CF_2Cl$ | 38 |
| $CF_2Cl.CF_2Cl$ | 53.8 |

The organic recovery (of halogenated ethanes) was 91.8 mol percent.

Example 2

A mixture of anhydrous HF and $CF_2Cl.CF_2Cl$ in the molal ratio of 3.7:1 was passed through the reactor described in Example 1, with the reactor temperature maintained at 593° C. and at a rate providing a catalyst contact time of 15–16 seconds. The condensate had the following composition:

| Compound: | Mol percent |
|---|---|
| $CF_3Cl$ | 8.8 |
| $CF_3.CF_3$ | 9.2 |
| $CF_3.CF_2Cl$ | 47.5 |
| $CF_2Cl.CF_2Cl$ | 34.5 |

The organic recovery (of halogenated ethanes) was 91.2 mol percent.

Example 3

A mixture of anhydrous HF and $CF_2Cl-CF_2Cl$ in the molal ratio of 0.5:1 was passed through the reactor described in Example 1. With the reactor temperature maintained at 500° C. and with a flow rate such as to give a contact time of 10 seconds, the composition of the effluent gases was as follows:

| Compound: | Mol percent |
|---|---|
| $CF_3Cl$ | 1.0 |
| $CF_3CF_2Cl$ | 28.3 |
| $CF_3CF_3$ | Nil |
| $CF_2ClCF_2Cl$ | 68.0 |
| "High boilers" | 2.7 |

Organic recovery (of halogenated ethanes) was 96.3 mol percent.

Example 4

A mixture of anhydrous HF and $CF_2Cl.CHF_2$ in the molal ratio of 2.2:1 was passed through the reactor described in Example 1, with the reactor temperature maintained at 550° C.–560° C. and at a rate providing an approximate catalyst contact time of 21–22 seconds. The effluent gases, treated in the manner described in Example 1, had the following composition:

| Compound: | Mol percent |
|---|---|
| Unidentified low boilers | 10.2 |
| $CF_3.CHF_2$ | 14.5 |
| $CF_2Cl.CHF_2$ | 75.3 |

The organic recovery (of halogenated ethanes) was 89.8 mol percent.

Example 5

A mixture of anhydrous HF and $CF_3.CFCl.CFCl_2$ in the molal ratio of 1.3:1 was passed through the reactor described in Example 1, with the reactor temperature maintained at 445° C. and at a rate providing a catalyst contact time of 27–28 seconds. The liquid effluent product was washed with ice water and ice-cold $NaHCO_3$ solution and dried by passage in the vapor phase over soda lime and anhydrous calcium chloride. The product had the following composition:

| Compound: | Mol percent |
|---|---|
| Unidentified products boiling at −78° C. to −76° C. | 0.5 |
| $CF_3.CFCl.CF_2Cl$ | 5.0 |
| $CF_3.CFCl.CFCl_2$ | 94.5 |

The organic recovery (of halogenated propanes) was 99.5 mol percent.

The following examples show the deleterious effect which the presence of carbon has on the fluorination of chlorofluoroethanes in promoting carbon-carbon fission and in decreasing the conversion to desired products:

Example 6

The $CrF_3$ catalyst bed of Example 1 was replaced by a 22 inch bed of activated carbon. In a manner similar to that of Example 1, a mixture of anhydrous HF and $CF_2Cl.CF_2Cl$ in a molal ratio of 2:1 was passed through the reactor, with the reactor temperature maintained at 443° C. and with a contact time of 26–27 seconds. The condensate, upon fractionation, showed a conversion to $CF_3.CF_2Cl$ of only about 4% with an organic recovery (of halogenated ethanes) of 93.3%. An effort to increase the conversion by raising the temperature resulted in decrease in organic recovery with slight increase in conversion to an extent which makes the method economically non-feasible.

Example 7

In a reaction similar to that of Example 5, a mixture of anhydrous HF and CF₂Cl.CF₂Cl in a molal ratio of 2:1 was passed through a catalyst bed consisting of CrF₃ impregnated on activated carbon, the amount of CrF₃ being 10% of the weight of the carbon. The reactor was maintained at a temperature of 421° C. and a contact time of 28-29 seconds was provided. The conversion to CF₃.CF₂Cl was about 7.5% with an organic recovery (of halogenated ethanes) of 84%. Raising the temperature of the reactor to 560-575° C. with an HF: organic ratio of 2.5:1 and a contact time of 18-19 seconds gave a conversion to CF₃.CF₂Cl of less than 12.5% and the organic recovery dropped to less than 75%. Even under these conditions, the organic conversion and recovery are such that operation of this process is not economically feasible. On the other hand, an increase in temperature when using carbon-free CrF₃ pellets results in no drop in recovery and increases the conversion to desired products.

*Example 8*

In a reaction similar to that described in Example 5, a mixture of anhydrous HF and

in a molal ratio of 2:1 was passed through the catalyst bed of CrF₃ impregnated on activated carbon at a reactor temperature of 550-560° C. and with a contact time of 20-21 seconds. The effluent gases after washing, drying and condensation were subjected to fractionation. The conversion to CF₃.CHF₂ was about 10% and the organic recovery (of halogenated ethanes) was only 37%. The majority of the halogenated ethanes underwent pyrolytic decomposition.

The results of the above examples are summarized in the table.

operating conditions of the present invention. Thus asbestos, glass, kieselguhr, alumina and other minerals which might be considered are unsatisfactory because of the corrosive and disintegrating action of the hydrogen fluoride. Organic fibers, metallized cotton, wool, etc., are also precluded since they are not capable of withstanding the high temperatures involved. The use of salts as binders is also believed to be precluded because of deleterious catalytic effect of most of them on the organic compounds or because of complete disintegration of pellets made with salt binders at temperatures far below the temperatures required for the fluorination. Organic binders, such as glycerine, sugar, starch, etc., are not successful since they will not withstand the combined action of hydrogen fluoride and high temperatures, undergoing decomposition with deposition of deleterious carbon on the catalyst and usually with disintegration of the pellets.

The present invention provides a catalyst and a process for utilizing the catalyst valuable for the preparation of highly fluorinated ethanes and propanes, such as CF₃.CF₂Cl, CF₃.CHF₂, CF₃.CF₃ and CF₃.CFCl.CF₂Cl, which are not obtainable by the usual commercial methods of fluorination, e. g., with antimony chlorofluorides. The process is economical and commercially practicable because of its simplicity, the good yields of desired products and the high organic recoveries. The catalyst is provided in a highly stable and usable form which is free from deleterious materials and from carriers or binders which cannot withstand the hydrogen fluoride and high temperatures involved.

As many apparently widely different embodiments of this invention may be made without departing from the spirit and scope thereof, it is

| Type of Catalyst | Reactor Temp., in ° C. | Contact Time, in Seconds | Molal Ratio HF: Org. | Compound Fluorinated | Organic Recovery, Mol Per Cent | Conversions to the Following Compounds in Mol Per Cent | | | |
|---|---|---|---|---|---|---|---|---|---|
| | | | | | | CF₃CF₃ | CF₃CF₂Cl | CF₃CHF₂ | CF₃CFClCF₂Cl |
| CrF₃ pellets | 480-500 | 26-28 | 2.1 | CF₂ClCF₂Cl | 91.8 | Trace | 38 | | |
| Do | 593 | 15-16 | 3.7 | CF₂ClCF₂Cl | 91.2 | 9.2 | 47.5 | | |
| Do | 500 | 10 | 0.5 | CF₂ClCF₂Cl | 96.3 | Nil | 28.3 | | |
| Do | 550-560 | 21-22 | 2.2 | CF₂ClCHF₂ | 89.8 | | | 14.5 | |
| Do | 445 | 27-28 | 1.3 | CF₃CFClCFCl₂ | 99.5 | | | | 5.0 |
| Activated carbon | 443 | 26-27 | 2 | CF₂ClCF₂Cl | 93.3 | | 4 | | |
| CrF₃—carbon | 421 | 28-29 | 2 | CF₂ClCF₂Cl | 84 | | 7.5 | | |
| Do | 560-575 | 18-19 | 2.5 | CF₂ClCF₂Cl | 75 | | 12.5 | | |
| Do | 550-560 | 20-21 | 2 | CF₂ClCHF₂ | 37 | | | 10 | |

A comparison of the results given in the table shows the marked superiority of the CrF₃ pellets of the present invention over CrF₃ impregnated on a carbon support. Under similar operating conditions superior conversions and an overwhelming superiority in practically eliminating pyrolysis of the organic compounds is obtained. In addition to causing carbon-carbon fission resulting in poor organic recoveries, the pyrolysis causes a rapid loss of catalyst activity with increasingly poor conversions. These disadvantages have been effectively overcome through the use of the specially prepared and pretreated CrF₃ pellets under the reaction conditions of the present invention. Furthermore, in the event that carbon deposition takes place on the CrF₃ pellets, which would then catalyze carbon-carbon fission, the deleterious carbon may be removed by burning with air or oxygen without unduly affecting the original catalyst activity.

The use of other supports or carriers for CrF₃, instead of carbon, appears to be precluded by the to be understood that the invention is not limited to the specific illustrations thereof except as defined in the appended claims.

What is claimed is:

1. The process of preparing a fluorinated aliphatic organic compound which comprises reacting a halogenated aliphatic hydrocarbon of 2 to 3 carbon atoms, having at least one halogen atom other than fluorine, in the vapor phase with anhydrous hydrogen fluoride in the presence of hard refractory pellets consisting of substantially pure CrF₃ catalyst at temperatures of from about 450° C. to about 700° C. and separating the fluorinated compound.

2. The process of preparing a fluorinated aliphatic organic compound which comprises reacting a halogenated aliphatic hydrocarbon of 2 to 3 carbon atoms, having at least one halogen atom other than fluorine, in the vapor phase with anhydrous hydrogen fluoride in the presence of hard refractory pellets consisting of substantially pure CrF₃ catalyst at temperatures of from about 450° C. to about 700° C. for from about 10 to about 30 seconds, and separating the fluorinated compound.

3. The process of preparing a fluorinated aliphatic organic compound which comprises reacting a halogenated aliphatic hydrocarbon of 2 to 3 carbon atoms, having at least one halogen atom other than fluorine, in the vapor phase with anhydrous hydrogen fluoride in a molal ratio of hydrogen fluoride to halogenated hydrocarbon of from about 0.5:1 to about 3:1 in the presence of hard refractory pellets consisting of substantially pure $CrF_3$ catalyst at temperatures of from about 450° C. to about 700° C. and separating the fluorinated compounds.

4. The process of preparing $CF_3.CF_3$ which comprises bringing mixed vapors of HF and $$CF_2Cl.CF_2Cl$$

into contact with hard refractory pellets consisting of substantially pure $CrF_3$ catalyst at a temperature of about 600° C. to 700° C. and separating the $CF_3.CF_3$ formed.

5. The process of preparing $CF_3.CF_2Cl$ which comprises bringing mixed vapors of HF and $CF_2Cl.CF_2Cl$ into contact with hard refractory pellets consisting of substantially pure $CrF_3$ catalyst at a temperature of about 450° C. to about 550° C. and separating the $CF_3.CF_2Cl$ formed.

6. The process of preparing $CF_3.CHF_2$ which comprises bringing mixed vapors of HF and $$CF_2Cl.CHF_2$$

into contact with hard refractory pellets consisting of substantially pure $CrF_3$ catalyst at a temperature of about 450° C. to about 700° C. and separating the $CF_3.CHF_2$ formed.

ANTHONY FRANCIS BENNING.
JOSEPH DAL PARK.
STANLEY EARL KRAHLER.

REFERENCES CITED

The following references are of record in the file of this patent:

UNITED STATES PATENTS

| Number | Name | Date |
|---|---|---|
| 1,937,885 | Gitzen et al. | Dec. 5, 1933 |
| 2,110,369 | Leicester | Mar. 8, 1938 |
| 2,400,446 | Veltman | May 14, 1946 |
| 2,461,523 | Coffman et al. | Feb. 15, 1949 |

OTHER REFERENCES

Catalysis, Berkman et al., pub. by Reinhold Pub. Corp., N. Y. (1940), page 426.